UNITED STATES PATENT OFFICE.

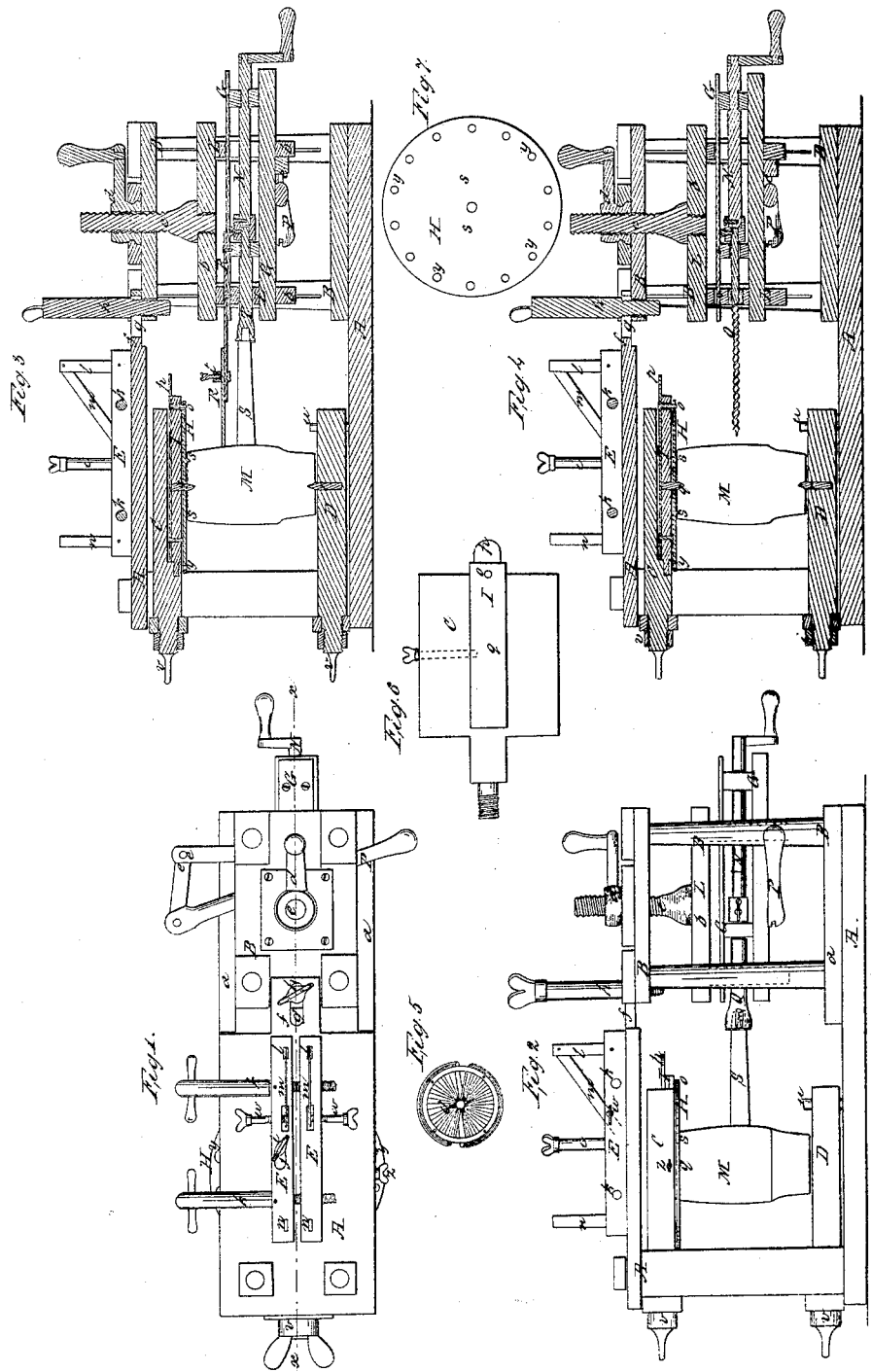
E. N. Kilpatrick,
Tenoning Spokes and Boring Fellies.
N° 17,509. Patented June 9, 1857.

E. N. KILPATRICK, OF BYHALIA, MISSISSIPPI.

WHEELWRIGHT'S MACHINE.

Specification of Letters Patent No. 17,509, dated June 9, 1857.

*To all whom it may concern:*

Be it known that I, E. N. KILPATRICK, of Byhalia, in the county of Marshall and State of Mississippi, have invented a new and Improved Wheelwright's Machine; and I do hereby declare that the following is a full and exact description thereof, reference being had to the accompanying drawings, making part of this specification, Figure 1 being a plan of the machine; Fig. 2, a side elevation thereof; Fig. 3, a vertical section thereof in the plane indicated by the line $x$, $x$, Fig. 1, and representing the machine arranged for cutting the tenons on the ends of the spokes; Fig. 4, a similar section, representing the machine arranged for boring the mortises in the hubs; Figs. 5, 6, and 7, views of parts detached.

Like letters designate corresponding parts in all the figures.

My invention is a machine intended for the use of wheelwrights, to facilitate the various operations in constructing carriage wheels, and to insure greater accuracy in performing those manipulations. The frame A, in which the other parts are mounted, consists of a bottom plank, or sole, two posts extending upward from one end thereof, and a top plank, or table, secured to said posts, and extending over one half or more of the sole. The whole frame is of suitable dimensions to conveniently answer the purposes intended.

The tenon and mortise apparatus is composed principally of a frame B, movable horizontally between guides $a$, $a$, arranged lengthwise upon the sole of the frame A; a frame L, movable vertically in the frame B; and a carriage G, sliding horizontally in the frame L, in a direction parallel with the movement of the frame B; and a shaft N, mounted in the carriage G, for holding the tools which cut the tenons and mortises, and for receiving and imparting the power by which said tools are to be driven.

The frame B, is adjusted upon the frame A, by means of a slot $g$, in a tongue $f$, which projects from the table of the frame A; and of a set screw $h$, passing through said slot to tighten said tongue to the frame B, as shown.

The frame L, is adjusted vertically in the frame B, by means of a screw $c$, projecting upward from the top plate $b$, of said frame L, through the top of the frame B; and of a nut $d$, secured upon said top of the frame B, and turning on said screw, substantially as represented.

The carriage G, in which the tenon and mortise cutters are mounted, is moved to and from the work, by means of a lever P, pivoted to the said carriage, at the middle, and at one end to a projection from the frame L, as seen at $e$, $e$, Fig. 1.

The hubs M, are secured in the machine between two plates C, D, which are confined in their proper positions by shanks passing between the two upright posts of the frame A; and set-screws $v$, $v$, screwed thereon. They are adjusted to any height between said posts by loosening the set-screws, and tightening again, after adjusting the plates.

In the top of the bottom plate D, is a pointed pivot $r$, which fits into a hole made in the center of the hubs. In the bottom of the upper plate C, is situated a metallic block I, which is made to be adjusted in different positions in the plate, and held by a set-screw $z$. From the bottom of this block, a pointed pivot $q$ projects for entering a hole in the center of the hubs. By adjusting said block I, to different positions in its plate the mortises are made in the hubs at various inclinations, so as to render the wheels more, or less, or not at all, dishing.

A graduating disk H, (represented detached in Fig. 7,) is attached to the top of each hub M, by spur points $s$, $s$, projecting from the disk, and driven into the end of the hub; and is centered thereon by having a central aperture, to fit on the point $q$, of the upper plate C. It is provided with a set of concentrically arranged holes $y$, $y$, at uniform distances apart, and equal in number to the number of spokes to be given to each wheel. A spring $p$, is secured to the top of the block I, as shown in the drawings. From the projecting, free end thereof, a pin $o$, extends down, through a hole in said block, and into one of the holes $y$, $y$, of the disk H, whereby said disk is held in such positions as the holes therein determine, until the corresponding motions are made in the hub below, by bringing the mortise borer O, thereto. The hub is set for each mortise successively to be made, by lifting the spring $p$, and turning the disk H, till the pin $o$, enters the hole $y$, next in order.

To bore the spoke holes in the fellies, there are two pins $u$, projecting upward from the inner corners of the lower plate D, against which the convex edge of each felly is placed, in the proper position. The block I, of the upper plate C, having been removed, the two plates are brought near together, after loosening their set-screws $v, v$, and fixed in such positions as to allow barely space between for the reception of a felly. A thin wedge is then lightly pushed in over the felly, just tightly enough to keep the felly from slipping out of its place. After boring one hole, the wedge is withdrawn, and the felly shifted to a proper position for boring the other hole therein.

Upon the top of the table of the frame A, are situated two clamp bars E, E, which are made adjustable lengthwise of the machine, by a slot $j$, and tightening screw $i$. From the ends of each bar project upward small posts $l, n$, substantially as represented in the drawings. Between these posts the spokes are inserted, for the purpose of marking their length, and the shoulders of their tenons. The two bars are adjusted toward or from each other by set-screws, $k, k$, so as to retain the spokes in their positions while marking. There are braces $m, m$, pivoted respectively to the tops of the posts $l, l$, and extending thence obliquely to the bars, in which they are adjusted, and confined by set-screws $w, w$. By this means, the posts $l, l$, are adjusted to any angle of inclination to the bars, for the purpose of marking the shoulders of the spokes to fit the mortises in the hubs, for making the wheels dishing.

In marking the hub tenons, the ends of the spokes are placed against the tightening nut $h$, the distance between the posts $l, l$, and said nut being adjusted to give the desired length of tenon. Then by having the bars E, E, graduated so as to determine the proper length of spokes for the different sizes of wheels, by marking the shoulders for the outer ends of the spokes, exact uniformity is obtained in their lengths; since the nut $h$, both determines the length of hub tenon given to the spoke, and the position of the frame B, which holds the tenon cutters.

When the spokes have been marked, the hub tenons are cut, by inserting the spoke between the plates C, D, which are brought sufficiently near each other for the purpose; and the pivots $q, r$, answer for stops for the other end of the spokes to bear against. After a set of spokes, having been thus far prepared, are driven into a hub, the hub is inserted in its place between the plates C, D, for the purpose of cutting the felly tenons on the spokes. The adjustable block I, disk H, and spring stop $p, o$, are employed for holding the hub in the right position to cut the tenons on the spoke, similar to the manner described for cutting the mortises in the hubs.

In order to cut the tenons accurately, a gage rod R, (Fig. 3,) is secured in the cutter carriage G, as represented. This rod is graduated correspondently with the spoke marking apparatus E, F, and is adjusted for the different sizes of wheels by the joint and coupling grips $t$. As soon as the cutter T has cut the tenon on the spoke S, the rod strikes the hub M, as represented in Fig. 3.

For cutting the tenons on the spokes, I usually employ two cutters. First a taper cutter Q (Fig. 2,) is inserted, which, operating upon the spoke S, at first, of the form shown in said figure, leaves it in the shape indicated in Fig. 3. A cutter T, (Fig. 3,) is then inserted, for cutting the tenon to a uniform diameter, and leaving a square shoulder.

What I claim as my invention, is—

The combined arrangement of the spoke-marking apparatus, cutter frames, gage rod, and hub holders, in such relation to each other as to enable the tenons of the spokes to be marked and formed with entire uniformity and unerring accuracy, substantially as specified.

The above specification of my improved wheelwright's machine, signed by me this 28th day of January, 1857.

E. N. KILPATRICK.

Witnesses:
WILSON DURMER,
T. S. RODGERS.